US010119548B2

(12) United States Patent
Venter (10) Patent No.: US 10,119,548 B2
(45) Date of Patent: Nov. 6, 2018

(54) AIRCRAFT ENGINE WITH A COMPRESSOR DEVICE

(71) Applicant: Rolls-Royce Deutschland Ltd & Co KG, Blankenfelde-Mahlow (DE)

(72) Inventor: Gideon Venter, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 504 days.

(21) Appl. No.: 14/863,860

(22) Filed: Sep. 24, 2015

(65) Prior Publication Data

US 2016/0090988 A1    Mar. 31, 2016

(30) Foreign Application Priority Data

Sep. 26, 2014    (DE) .................. 10 2014 114 043

(51) Int. Cl.
F04D 25/02      (2006.01)
F02K 3/06       (2006.01)
(Continued)

(52) U.S. Cl.
CPC .............. *F04D 25/028* (2013.01); *F02C 7/36* (2013.01); *F02K 3/06* (2013.01); *F04D 19/002* (2013.01);
(Continued)

(58) Field of Classification Search
CPC ...... F04D 25/028; F04D 19/002; F04D 25/04; F04D 29/053; F04D 29/059;
(Continued)

(56) References Cited

U.S. PATENT DOCUMENTS 8,297,916 B1 * 10/2012 McCune ............... F01D 25/164
                                                    415/124.1
8,763,251 B2 *  7/2014 McCune ............... F16H 57/082
                                                    29/893.1
(Continued)

FOREIGN PATENT DOCUMENTS

EP        2518296 A2    10/2012

OTHER PUBLICATIONS

European Search Report dated Feb. 11, 2016 for counterpart European application No. 15186113.5.
(Continued)

*Primary Examiner* — Aaron R Eastman
(74) *Attorney, Agent, or Firm* — Shuttleworth & Ingersoll, PLC; Timothy Klima (57) ABSTRACT

What is described is an aircraft engine with a compressor device and with a fan device. In the area of a compressor shaft, the compressor device is connected via an epicyclic gear to a fan shaft. A planetary web is operatively connected via bearing devices to the planetary gears. A ring gear is coupled with the fan shaft and a sun gear of the epicyclic gear is coupled with the compressor shaft, while the planetary carrier is held at the housing side in a torque-proof manner. The ring gear is connected via a flexible connection device to the fan shaft and/or the planetary carrier is connected via a flexible connection device to the housing. In the area of the connection device, movements between the ring gear and the planetary gears and/or between the planetary carrier and the housing can be at least approximately compensated in the radial and the axial direction.

19 Claims, 5 Drawing Sheets

(51) Int. Cl.
*F02C 7/36* (2006.01)
*F04D 19/00* (2006.01)
*F04D 25/04* (2006.01)
*F04D 29/053* (2006.01)
*F04D 29/059* (2006.01)
*F04D 29/32* (2006.01)

(52) U.S. Cl.
CPC .......... *F04D 25/04* (2013.01); *F04D 29/053* (2013.01); *F04D 29/059* (2013.01); *F04D 29/321* (2013.01); *F04D 29/325* (2013.01); *F05D 2240/62* (2013.01); *F05D 2260/40311* (2013.01); *Y02T 50/671* (2013.01)

(58) Field of Classification Search
CPC ........ F04D 29/321; F04D 29/325; F02C 7/36; F02K 3/06; F05D 2240/62; F05D 2260/40311; Y02T 50/671
USPC ....................................................... 415/134
See application file for complete search history.

(56) References Cited

U.S. PATENT DOCUMENTS

| | | |
|---|---|---|
| 2005/0026745 A1 | 2/2005 | Mitrovic |
| 2010/0150702 A1 | 6/2010 | Sheridan et al. |
| 2012/0277055 A1* | 11/2012 | Sheridan ................. F01D 25/16 |
| | | 475/331 |
| 2013/0023378 A1 | 1/2013 | McCune et al. |

OTHER PUBLICATIONS

German Search Report dated Jul. 13, 2015 for related German Application No. 10 2014 114 043.5.

Trimble, Stephen, Part of the way to the future, Aug. 2014, p. 23, Flight International, ISSN 00153710.

* cited by examiner

AIRCRAFT ENGINE WITH A COMPRESSOR DEVICE

This application claims priority to German Patent Application 102014114043.5 filed Sep. 26, 2014, the entirety of which is incorporated by reference herein.

The invention relates to an aircraft engine with a compressor device according to the kind as disclosed herein.

Turbo-machines as they are known from practice usually have two or three rotors which turn at different rotational speeds with the same or with different rotational directions.

In directly driven machines, a low-pressure turbine or a compressor device of such a turbo-machine is directly connected to a fan, so that the low-pressure turbine and the fan rotate at the same rotational speed. In the next generation of turbofans having a high bypass ratio, the direct dependence of the fan speed and the speed of the low-pressure turbine is eliminated in order to be able to operate the fan as well as the low-pressure turbine at optimal operating ranges. In this context, an increase of the fan cross-section requires a reduction of the fan's rotational speed, whereas the low-pressure turbine's operational level of efficiency can be enhanced by increasing the rotational speed while at the same time also reducing the blade radius. The enhanced operational level of efficiency in turn offers the possibility to embody the low-pressure turbine with a smaller number of turbine stages, whereby the low-pressure turbine is characterized by a lower self-weight and can be manufactured in a more cost-effective manner.

The most efficient current method for transmitting the driving power of the low-pressure turbine and for lowering the turbine speed with respect to the rotational speed which is required for the operation of the fan is to couple the low-pressure turbine and the fan via a reducing gear.

Here, planet gear reducers with a planetary carrier that is fixed relative to the housing or with a planetary carrier that is embodied in a rotatable manner yield the desired gear reduction ratio and at the same time a high power density.

In order to achieve the necessary gear reduction ratio in the area of an epicyclic gear or of a planetary gear set in a planetary carrier that is embodied so as to be fixed relative to the housing, a compressor shaft of the low-pressure turbine is connected to a sun gear of an epicyclic gear. The ring gear is in turn coupled to a fan shaft that is driving the fan. The reaction moments in the area of the static planetary carrier are applied to the housing.

The torque that is acting in the area of the low-pressure turbine is transmitted centrically onto the sun gear via a spline shaft profile. From there, the torque is distributed to the planetary gear meshes. In the area of each of the tooth meshes between the sun gear and a planetary gear, the torque is additionally distributed between the two tooth areas of the planetary gears and of the sun gear that are embodied with mirror-inverted helix angles.

In the area of the tooth meshes between the planetary gears and the ring gear, the previously divided torque is again summed up and drives the ring gear and the fan that is operatively connected thereto. The reaction moments that are occurring in the area of the toothings between the planetary gears and the sun gear as well as between the planetary gears and the ring gear are deflected via bearings of the planetary gears into the planetary carrier that is fixed relative to the housing and from there into the housing of the turbo-machine. In order to avoid any twisting of the planetary carrier, the application of force is effected as much as possible in the center of the epicyclic gear, wherein spherical bearing units are additionally provided in order to facilitate compensatory movements that avoid a twist of the planetary carrier or compensatory movements that are diminishing a twist of the planetary carrier between the planetary gears and the planetary carrier.

Such an embodiment of an epicyclic gear is known from US 2005/0026745 A1, for example, in which spherical bearings are provided within the planetary gears in the area of the operative connections between the planetary carrier and the planetary gears in the area between a rotatably embodied planetary carrier.

Disadvantageously, in this embodiment of an epicyclic gear, compensatory movements that are minimizing the twist of the planetary carrier via the spherical bearing units can only be achieved through a correspondingly large layout of the spherical bearings, which, however, causes an undesired increase in installation space requirements, in the structural component weight and in manufacturing costs for the epicyclic gear.

The present invention is therefore based on the objective to provide an aircraft engine which is characterized by small installation space requirements and a low structural component weight, which can be manufactured in a cost-effective manner and in which a twist of a planetary carrier of an epicyclic gear is small.

According to the invention, this objective is solved through an aircraft engine with features as disclosed herein.

The aircraft engine according to the invention is embodied with a compressor device or a low-pressure turbine and with a fan device that can be driven by a compressor device via a fan shaft. For this purpose, the compressor device is connected in the area of a compressor shaft in an operative connection to a fan shaft via an epicyclic gear. A planetary web of the epicyclic gear is in turn connected with planetary gears rotatably mounted thereon via bearing devices that are respectively arranged in the planetary gears. The bearing devices respectively comprise a spherical bearing unit for compensating tilting movements between the planetary carrier and the planetary gears, and a further bearing unit for rotational decoupling between the planetary carrier and the planetary gears.

According to the invention, a ring gear is coupled to the fan shaft and a sun gear of the epicyclic gear is coupled with the compressor shaft, while the planetary carrier is held at the housing side in a torque-proof manner, wherein the ring gear is connected via a flexible connection device to the fan shaft and/or the planetary carrier is connected via a flexible connection device to the housing, and in the area of the connection device movements between the ring gear and the planetary gears and/or between the planetary carrier and the housing can be at least approximately compensated in the radial and the axial direction.

Via the connection device between the planetary carrier and the housing, which can be embodied as a flexible membrane, movements and deflections at the housing side can be decoupled from the planetary carrier that is arranged at the housing side in a torque-proof manner in a simple way, whereby misalignments in the area of the tooth meshes between the planetary gears and the sun gear as well as between the planetary gears and the ring gear can be avoided or reduced with little effort, and production-related misalignments in these tooth areas can be compensated with spherical bearing units that are advantageous with regard to installation space and are characterized by a low weight.

In addition or alternatively, via the connection device between the ring gear and the fan shaft, which can be embodied as a flexible membrane, movements and deflections in the area of the fan shaft and movements and deflections in the area of the ring gear can be decoupled from each other in a simple manner, whereby misalignments in the area of the tooth meshes between the planetary gears and the ring gear can be avoided or reduced with little effort, and production-related misalignments in these tooth areas can be compensated for by spherical bearing units that are advantageous with regard to installation space and characterized by low weight.

Here, there is the possibility of embodying the connection device in the area between the planetary gear and the housing or in the area between the ring gear and the fan shaft with a sheet metal part, which can be manufactured by means of deep-drawing and which has the flexibility necessary for the compensation in the radial as well as in the axial extension of the epicyclic gear.

Among other things, twisting or torsions in the area of the planetary carrier or of the planetary web are thus avoided in a simple manner. In this way, an epicyclic gear can on the whole be manufactured and used in a cost-effective manner with small dimensions that are advantageous with regard to installation space and with low self-weight.

In a constructionally simple embodiment of the aircraft engine according to the invention that is compensating the movements between the planetary carriers and the housing and/or between the ring gear and the fan shaft in the radial and the axial direction to the necessary degree, the flexible connection device comprises or the flexible connection devices comprise respectively one area having a cross-section that is at least approximately embodied in a u-shaped manner. The connection device that is respectively acting as a compensator can then be embodied in the radial and in the axial direction with the flexibility that is necessary for the compensation of the movements between the planetary carrier and the housing and/or between the fan shaft and the ring gear, and in the circumferential direction with a desired degree of stiffness in order to be able to support to a desired extent the reaction moments that are acting during operation in the area of the planetary carrier in the area of the housing and to be able to transmit torques between the fan shaft and the ring gear.

An embodiment of the aircraft engine according to the invention that is also constructionally simple and compensates movements between the fan shaft and the ring gear in the radial and the axial direction to the necessary degree, is formed with a flexible connection device between the fan shaft and the ring gear, which comprises an area having a cross-section that is embodied at least approximately in an L-shaped manner. The connection device that is acting as a compensator is then embodied with the flexibility in the radial and in the axial direction that is necessary for the compensation of the movements between the fan shaft and the ring gear, and can be embodied in the circumferential direction with a desired high degree of stiffness in order to be able to transmit to a desired degree the torques that are acting during operation in the area of the ring gear and the fan shaft.

In a further development of the aircraft engine according to the invention in which manufacturing tolerances are compensated with small effort, the bearing devices comprise respectively one spherical bearing unit for compensating tilting movements between the planetary carrier and the planetary gears, and a further bearing unit for rotational decoupling between the planetary carrier and the planetary gears.

In one embodiment of the aircraft engine according to the invention that is characterized by small installation space requirements, the planetary carrier is respectively connected via the spherical bearing units in an operative connection to an inner bearing element that is arranged radially inside a planetary gear.

In a further development of the aircraft engine according to the invention that is advantageous with regard to installation space, the inner bearing elements are rotatably connected to the planetary gear via the further bearing units that are arranged respectively between a planetary gear and an inner bearing element.

When the planetary carrier meshes by means of finger-like areas, which cooperate with the spherical bearing units, with the planetary gears, reaction moments that occur in the area of the tooth meshes between the planetary gears and the ring gear as well as between the planetary gears and the sun gear can be applied into the planetary carrier in the middle of the epicyclic gear in a constructionally simple manner, whereby a torsion or twist of the planetary carrier in the circumferential direction is further reduced and deflections having a negative effect on the tooth meshes of the planetary gears with the ring and the sun gear can be decreased or avoided with small effort.

In a further development of the aircraft engine according to the invention that is embodied in an easy-to-mount and constructionally simple manner, the planetary carrier is connected with the inner bearing elements in the area of the finger-like areas via bolt elements that are arranged so as to extend in the radial direction of the epicyclic gear.

When the bolt elements are respectively coupled in an aligned manner in approximately the middle of the planetary gear with a coupling element of the spherical bearing unit that is arranged in the area of the finger-like areas of the planetary carrier and is at least in certain areas embodied in a spherical manner and with an inner bearing element, only small reaction moments act in the area of the epicyclic gear that are affecting the tooth meshes between the planetary gears and the ring and the sun gear, as the reaction moments are applied to the planetary carrier substantially in the middle of the epicyclic gear.

In a constructionally simple embodiment of the aircraft engine according to the invention that can be mounted with small effort, the bolt elements are fixedly attached in the radial direction in the area of the inner bearing elements.

In cost-effective further embodiments of the aircraft engine according to the invention, the further bearing units are embodied as rolling and/or slide bearings.

If the planetary gears have respectively two helically-toothed tooth areas that are separated from each other and arranged at a distance from each other in the axial direction and that respectively comb with the helically-toothed tooth areas of the ring gear and of the sun gear that are corresponding to them, and if the helix angle of the tooth areas of the planetary gears, of the ring gear and of the sun gear are embodied in a mirror-inverted manner for the purpose of minimizing axial toothing forces, the structural components of the epicyclic gear of the aircraft engine according to the invention can be designed with small dimensions due to the comparatively low loads that are occurring during operation, whereby installation space requirements of the epicyclic gear are small and a total weight of the aircraft engine can be reduced to a desired extent.

If the planetary carrier is connected radially within the finger-like areas to the housing via the connection device, the connection device can be embodied with such a component length or connection length between the planetary carrier and the housing as it is advantageous for a desired high flexibility, even when the available installation space is small.

In a differing embodiment of the aircraft engine that is embodied without the connection device in the area between the planetary carrier and the housing, the planetary carrier is attached to the housing radially outwardly of the finger-like areas in a manner advantageous with regard to the installation space.

If a planetary carrier of an epicyclic gear, in particular of an epicyclic gear of an aircraft engine as it is described in more detail above, which is preferably embodied with conduits for guiding fluid, is manufactured my means of a 3D printing method, the planetary carrier can be produced in a simple manner at low manufacturing costs.

The features as specified in the patent claims as well as the features as specified in the following exemplary embodiment of the aircraft engine according to the invention are respectively suitable to provide further developments of the subject matter according to the invention either applied on their own or in any combination with each other.

Further advantages and advantageous embodiments of the subject matter according to the invention follow from the patent claims and the exemplary embodiment that is principally described in the following by referring to the drawing.

Herein.

Figure 1:
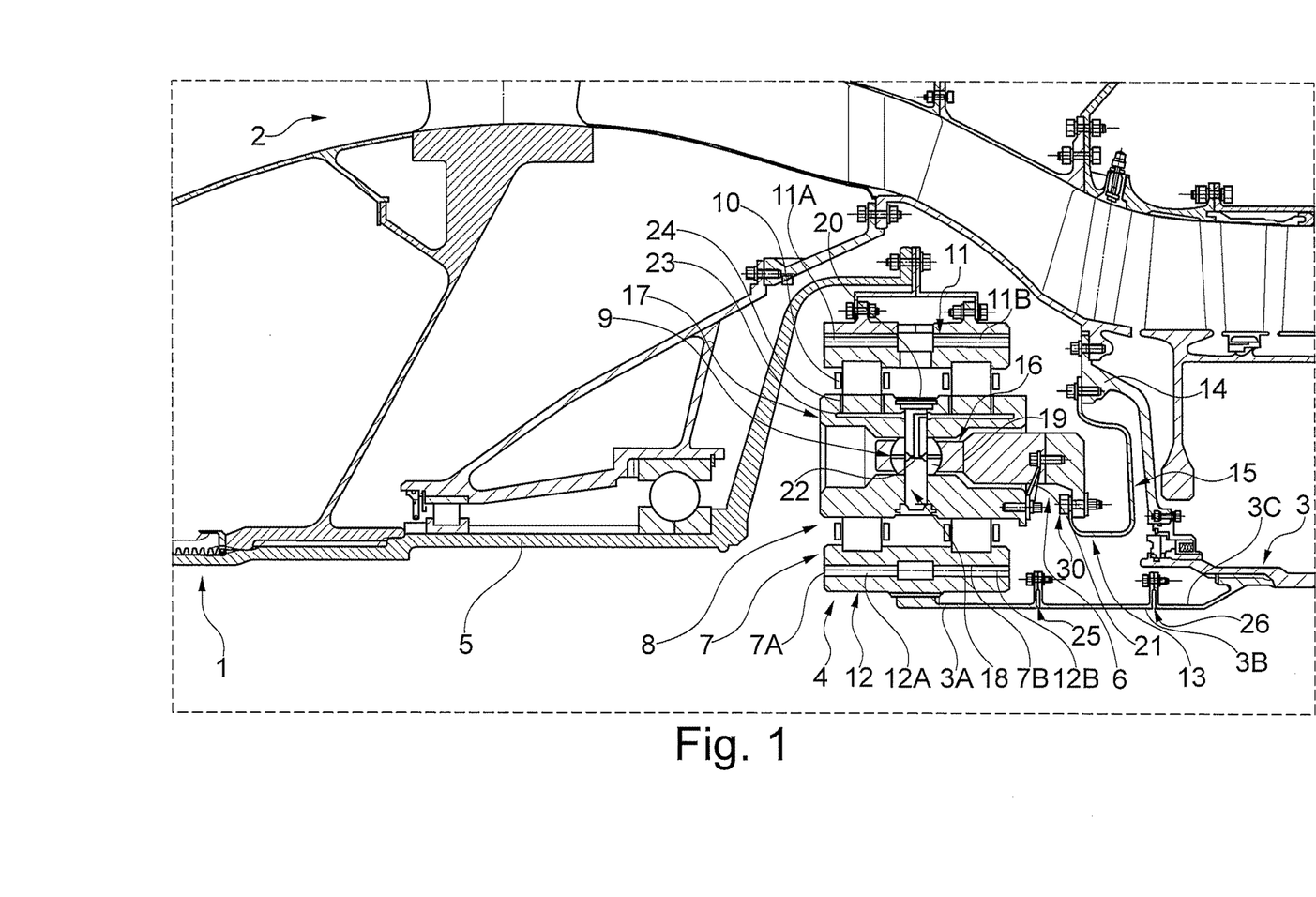
FIG. 1 shows a strongly schematized partial longitudinal section view of a first exemplary embodiment of the aircraft engine according to the invention.

FIG. 1 shows a partial longitudinal section view of an aircraft engine 1, in which a front area of the aircraft engine 1 is shown that in the present case is embodied as a gas turbine machine. In a back area, the aircraft engine 1 is embodied with a compressor device that is not shown in any more detail, and in a front area with a fan device 2. The fan device 2 can be driven by the compressor device, wherein for this purpose the compressor device is connected in the area of a compressor shaft 3 to a fan shaft 5 via an epicyclic gear 4. A planetary web 6 of the epicyclic gear 4 is connected via bearing devices 8 that are arranged in planetary gears 7 to the planetary gears 7 that are rotatably arranged on the planetary web 6 in a per se known manner.

The bearing devices 8 respectively comprise one spherical bearing unit 9 for compensating any tilting movements between the planetary carrier or the planetary web 6 and the planetary gears 7, and another bearing unit 10 for rotational decoupling between the planetary carrier 6 and the planetary gears 7. A ring gear 11 is connected to the fan shaft 5 in a torque-proof manner, while a sun gear 12 is operatively connected in a torque-proof manner with the compressor shaft 3.

Via a flexible connection device 13, the planetary carrier 6 is held at the housing side in a torque-proof manner. In the area of the connection device 13, movements between the planetary carrier 6 and a housing 14 can be at least approximately compensated or made up for in the radial and in the axial direction, whereby the tooth meshes in the area between the planetary gears 7 and the ring gear 11 as well as between the planetary gears 7 and the sun gear 12 are rendered failure-free to a desired degree independently of any movement of the housing as it may occur in the area of the housing 14 due to the impact of loads, and whereby the planetary gears 7 comb with the ring gear 11 as well as with the sun gear 12 as lossless as possible and with little wear and tear.

The flexible connection device 13 comprises an area 15 that has a cross-section which is embodied in an at least approximately u-shaped manner and which facilitates the desired flexible attachment of the planetary carrier 6 at the housing 14 in the axial direction as well as in the radial direction of the aircraft engine 1 and is at the same time embodied with a suitable stiffness in the circumferential direction to be able to support to a desired degree, via the planetary carrier 6 in the area of the housing 14, any reaction moments that occur during operation of the aircraft engine 1 in the area of the epicyclic gear 4.

Figure 2:
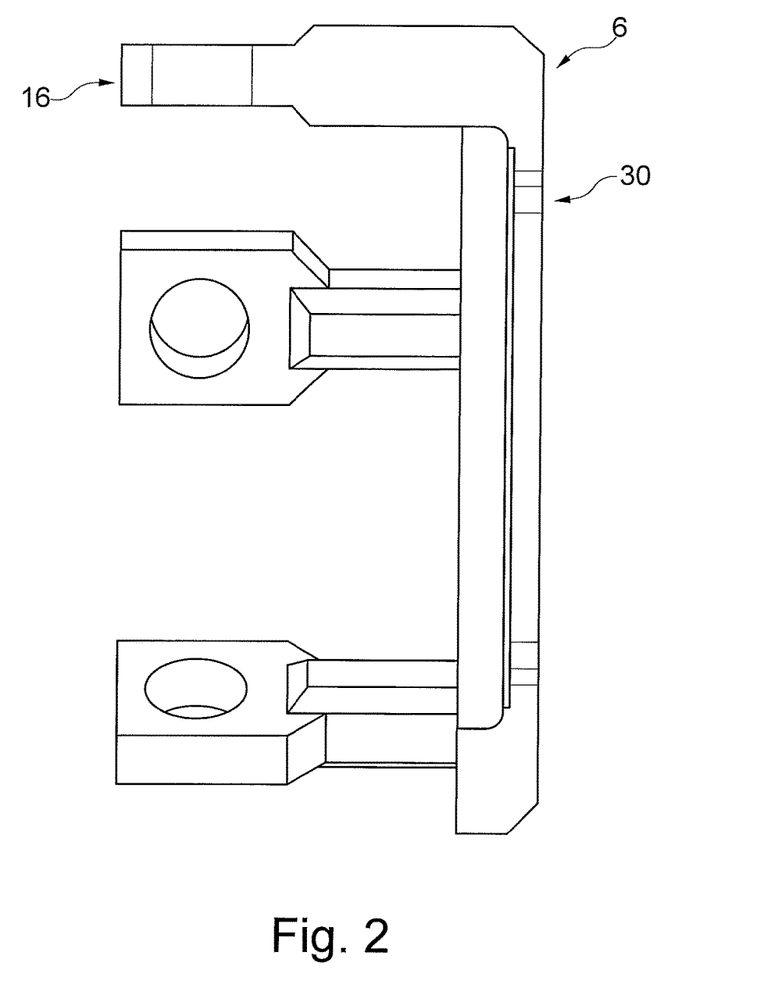
FIG. 2 shows a schematized three-dimensional individual view of a planetary carrier of an epicyclic gear of the aircraft engine according to FIG. 1.

The planetary carrier 6 meshes with the planetary gears 7 by means of the finger-like areas 16 that are shown in more detail in FIG. 2, wherein in the present case the planetary carrier 6 is connected by means of the finger-like areas 16 to the spherical bearing units 9, and via these is coupled in an operative connection with the inner bearing elements 17 that are also arranged radially within of the planetary gears 7. The inner bearing elements 17 are rotatably connected with the planetary gears 7 via the further bearing units 10 that are arranged between the planetary gears 7 and the inner bearing elements 17. In addition, in the area of the finger-like areas 16, the planetary carrier 6 is respectively coupled via the bolt elements 18 that are arranged to extend in the radial direction of the epicyclic gear 4 to the inner bearing elements 17. Here, the bolt elements 18 are respectively approximately aligned with the middle of the planetary gears 7, and respectively reach through a coupling element 19 of the spherical bearing units 9 that is arranged with an area of the finger-like areas 16 of the planetary carrier 6 and that is embodied so as to be spherical at least in certain areas, whereby the planetary web 6 is also connected to the inner bearing elements 17. In addition, in the present case the bolt elements 18 are secured in the area of the inner bearing elements 17 via spring rings 20 in the radial direction of the epicyclic gear 4 in the area of the inner bearing elements 17, so as to provide the operative connection between the planetary web 6 and the inner bearing elements 17 across the entire operating range of the aircraft engine 1 when the planetary gears 7 are rotating.

In the present case, the further bearing units 10 are embodied as cylindrical roller bearings, in the areas of which radial forces can be transmitted to the desired extent between the planetary gears 7 and the planetary web 6.

The planetary gears 7, the sun gear 12 as well as the ring gear 11 are respectively embodied with two helically-toothed tooth areas 7A and 7B, 11A and 11B, as well as 12A and 12B that are separated from each other and arranged at a distance from each other in the axial direction. For minimizing axial toothing forces, the helix angle of the tooth areas 7A and 7B of the planetary gears 7, of the tooth areas 11A and 11B of the ring gear 11, and of the tooth areas 12A and 12B of the sun gear 12 are embodied in a mirror-inverted manner. This means that the teeth of the tooth areas 7A and 7B as well as of the tooth areas 11A and 11B and also of the tooth areas 12A and 12B are respectively arranged in an oblique manner, wherein the helix angle respectively has the same value, but is respectively embodied in a mirror-inverted manner with respect to the corresponding tooth area of the planetary gears 7, of the ring gear 11 and of the sun gear 12.

In the area of the finger-like areas 16, the planetary web 6 is respectively coupled via a strut element 21 to the inner bearing elements 17 in a torque-proof manner in order to avoid a rotational movement of the inner bearing elements 17 with respect to the planetary carrier 6 with small effort.

To ensure that the toothings in the area of the epicyclic gear 4 can be provided with lubricating and cooling oil to the desired extent, lubricating and cooling oil is applied into the inside of the inner bearing elements 17 via the planetary web 6 that is embodied so as to be fixed relative to the housing, and is further transferred via lubricating and cooling oil conduits 22 that are arranged inside the bolt elements 18 in the radial direction of the epicyclic gear 4 from the spherical bearing units 9 into further conduits 23 that substantially extend in the axial direction. From there, the lubricating and cooling oil is transferred in the additional conduits 24 that also extend in the radial direction of the inner bearing elements 17 to the further bearing units 10. At that, during operation of the aircraft engine 1, lubricating and cooling oil is also transferred to the desired extent in the direction of the tooth meshes between the planetary gears 7 and the ring gear 11, as well as between the planetary gears 7 and the sun gear 12, which is performed by means of the rotating planetary gears 7.

To be able to reduce to a minimum the bending moments that are acting in the area of the sun gear 12, the compressor shaft 3 in the present case is embodied so as to be flexible to a defined extent, so that eccentricities that may be present between the compressor shaft 3 and the sun gear 12 can be compensated without creating excessive alignment errors in the area of the spline shaft connection between the compressor shaft 3 and the sun gear 12. Thus it is provided that the sun gear 12 takes its desired position during operation. For this purpose, the compressor shaft is divided into multiple connected areas 3A to 3C that are connected to each other via flange areas 25, 26.

Figure 3:
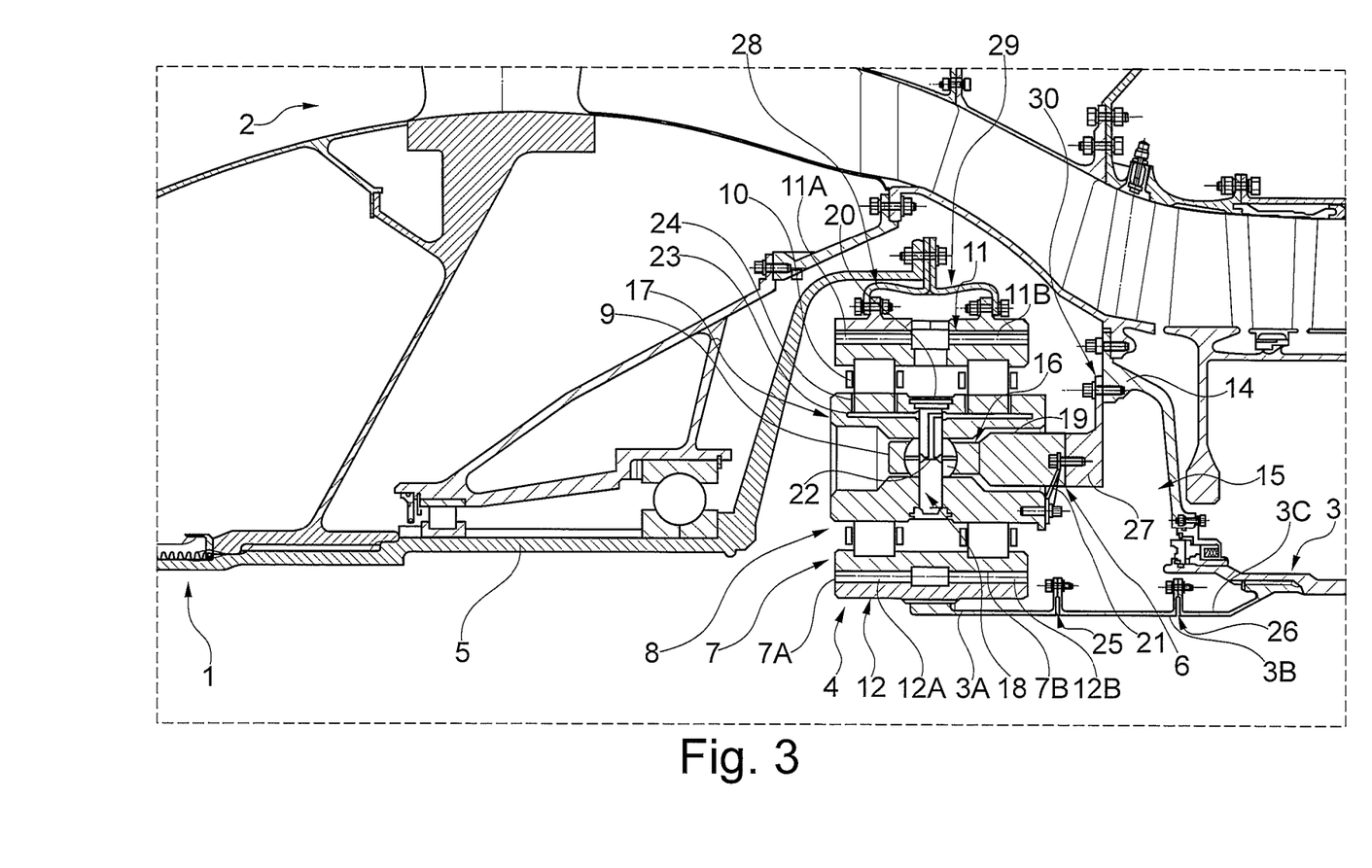
FIG. 3 shows a strongly schematized partial longitudinal section view of a second exemplary embodiment of the aircraft engine according to the invention.

FIG. 3 shows a rendering of a second exemplary embodiment of the aircraft engine 1 that corresponds to FIG. 1 and that differs from aircraft engine according to FIG. 1 only in the attachment area of the planetary carrier 6 at the housing 14 and of the ring gear 11 at the fan shaft 5, which is why the following description substantially contains more detailed reference only to the differences between the two exemplary embodiments of the aircraft engine 1 according to FIG. 1 and according to FIG. 3, with the foregoing description pertaining to FIG. 1 being referred to when it comes to the further functional principles of the aircraft engine 1 according to FIG. 3.

In one embodiment of the aircraft engine 1 according to FIG. 3, the planetary carrier 6 is connected to the housing 14 via connection element 27 that is stiff in the circumferential direction as well as in the axial direction and in the radial direction, so that in the area between the planetary carrier 6 and the housing 14 compensatory movements are not possible to the extent as described with respect to FIG. 1. To nevertheless provide for failure-free tooth meshes in the area of the epicyclic gear 4 to a desired degree and for the planetary gears 7 combing with the ring gear 11 as well as with the sun gear 12 as in a lossless manner and with as little wear and tear as possible, a further connection device 28 is provided between the fan shaft 5 and the ring gear 11 that has basically the same principle of operation as is provided in the connection device 13 of the aircraft engine 1 according to FIG. 1. The connection device 28 is also configured with a u-shaped area 29 that facilitates the desired flexible attachment of the ring gear 11 at the fan shaft 5 in the axial direction as well as in the radial direction of the aircraft engine 1 according to FIG. 3, and at the same time is embodied with a stiffness in the circumferential direction by which the transmission of torques between the fan shaft 5 and the ring gear 11 is facilitated during operation of the aircraft engine 1.

Figure 4:
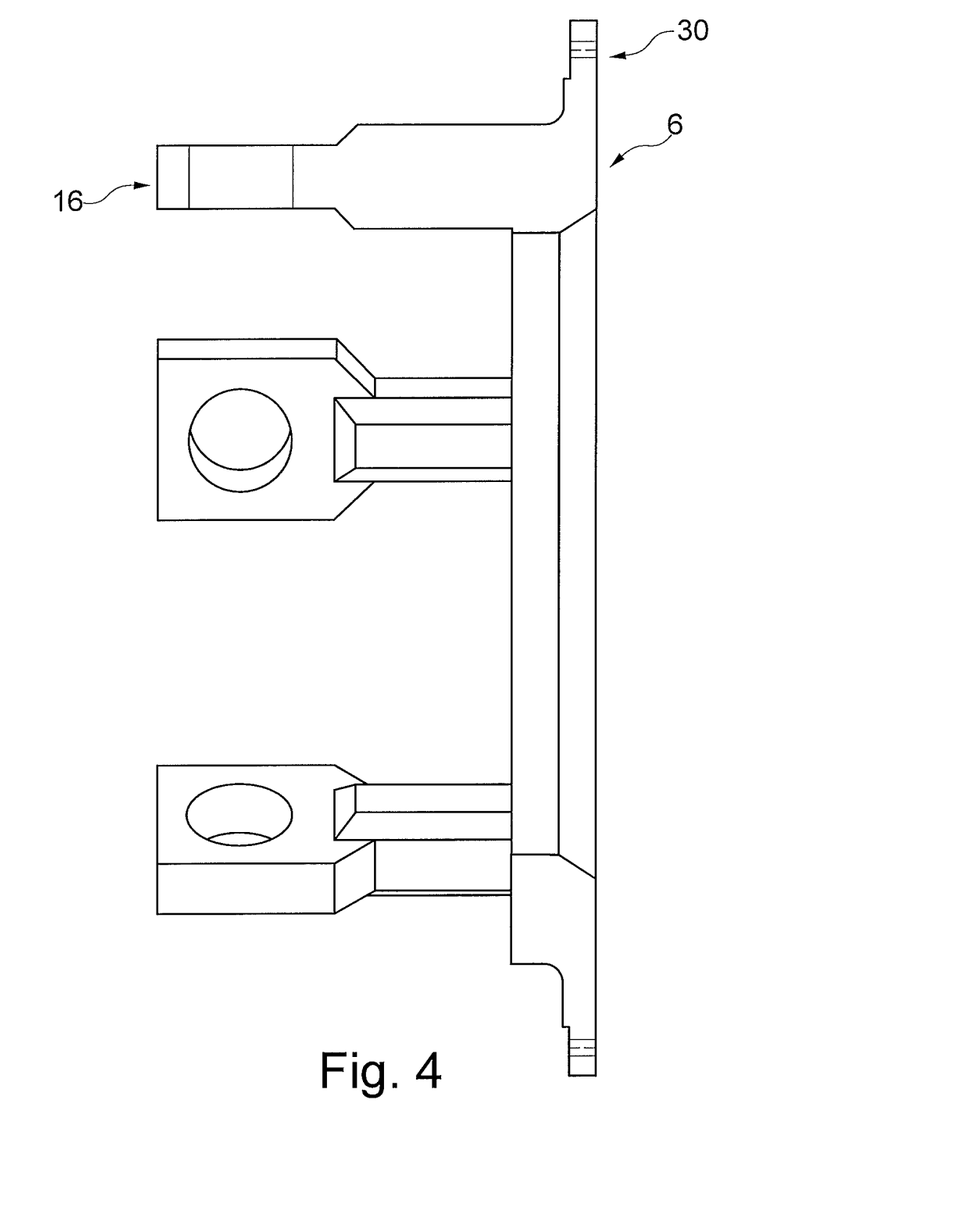
FIG. 4 shows a schematized three-dimensional individual view of a planetary carriers of an epicyclic gear of the aircraft engine according to FIG. 3.

The planetary carrier 6 of the aircraft engine 1 according to FIG. 3 that is shown in FIG. 4, also meshes in the manner as described in more detail in connection with FIG. 2 with the planetary gears 7 by means of the finger-like areas 16. In contrast to the embodiment of the planetary carrier 6 according to FIG. 2, the planetary carrier 6 according to FIG. 4 can be attached at the housing 14 in connection areas 30 radially outwardly of the finger-like areas 16, with the connection areas 30 being provided radially inside the finger-like areas 16 in the embodiment of the planetary carrier 6 according to FIG. 2 in order to be able embody the connection device 13 according to FIG. 1 with maximally possible connection length between the planetary carrier 6 and the housing 14, while at the same time being able to provide for small installation space requirements. In the last-mentioned embodiment of the planetary carrier 6 and the connection device 13 according to FIG. 1 or according to FIG. 2, a flexibility of the flexible connection device 13, which is acting as a compensator, can be provided in the area of the flexible connection device 13 as it is desired in the axial and in the radial direction, and namely in a manner that is advantageous with respect to installation space.

Figure 5:
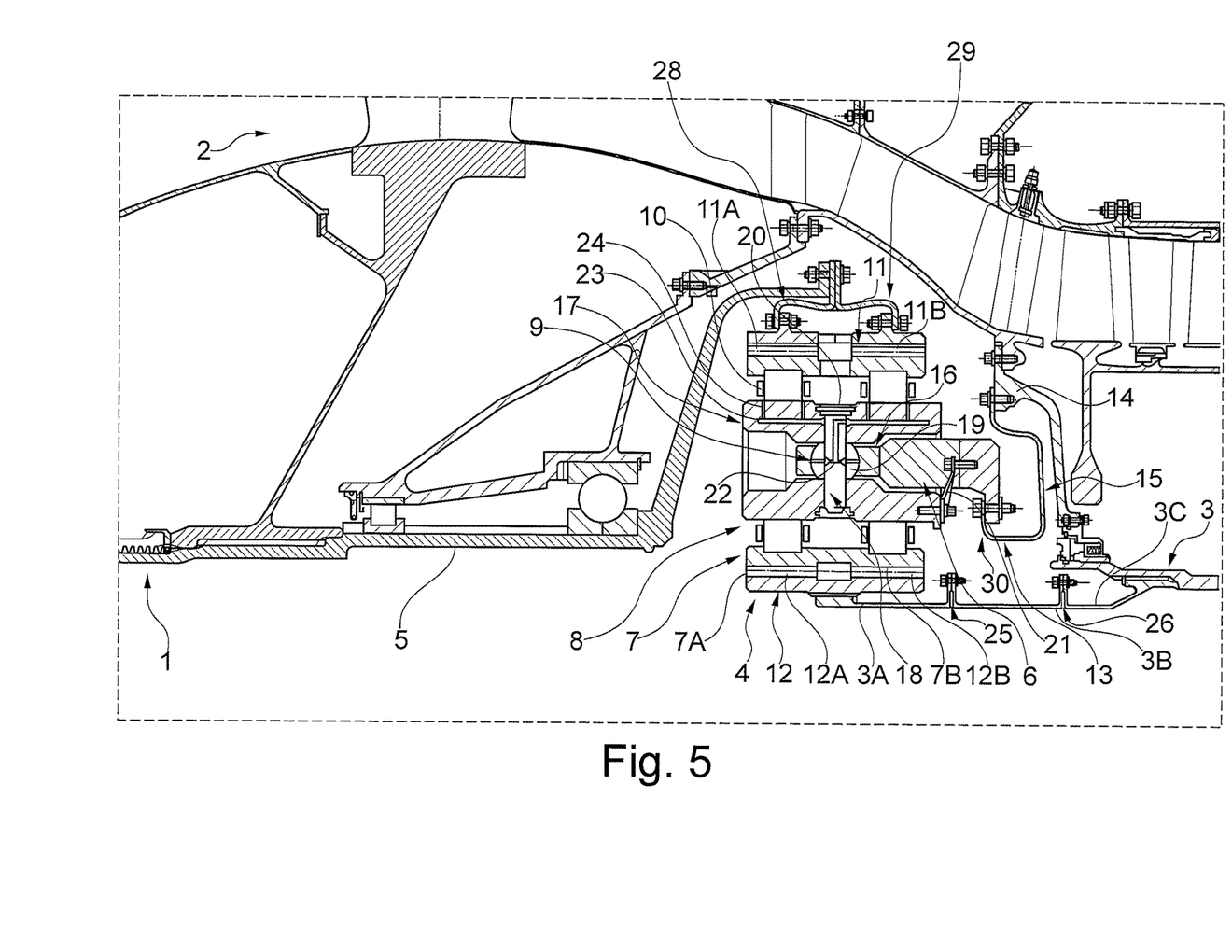
FIG. 5 shows a strongly schematized partial longitudinal section view of a third exemplary embodiment of the aircraft engine according to the invention.

A third embodiment of the aircraft engine according to the invention 1 is shown in FIG. 5, in which the planetary carrier 6 is coupled via the flexible connection device 13 according to FIG. 1 to the housing 14, and the ring gear 11 is coupled via the further connection device 28 according to FIG. 3 to the fan shaft 5. The third embodiment of the aircraft engine 1 according to FIG. 5 is thus a combination of the aircraft engine 1 according to FIG. 1 and the aircraft engine 1 according to FIG. 3, which is why it is referred to the foregoing description pertaining to FIG. 1 to FIG. 4 as far as the functional principle of the aircraft engine 1 according to FIG. 5 is concerned.

PARTS LIST 1 aircraft engine
2 fan device
3 compressor shaft
3A to 3C area of compressor shaft
4 epicyclic gear
5 fan shaft
6 planetary web, planetary carrier
7 planetary gear
7A, B tooth area of the planetary gear
8 bearing device
9 spherical bearing unit
10 further bearing unit
11 ring gear
11A, B tooth area of the ring gear
12 sun gear
12A, B tooth area of the sun gear
13 flexible connection device
14 housing
15 u-shaped area of the flexible connection device
16 finger-liker area of the planetary web
17 inner bearing element
18 bolt element 19 spherical coupling element
20 spring ring
21 strut element
22 lubricating and cooling oil conduit
23 further conduit
24 additional conduit
25, 26 flange area
27 connection element
28 further connection device
29 u-shaped area of the further connection device
30 connection area

The invention claimed is:

1. An aircraft engine, comprising:
a housing,
a compressor including a compressor shaft,
a fan shaft,
a fan driven by the compressor via the fan shaft,
an epicyclic gear connecting the compressor to the fan shaft in an area of the compressor shaft, the epicyclic gear including a ring gear, a sun gear, a planetary carrier, and a plurality of planetary gears, and for each of the plurality of planetary gears, a bearing device rotatably mounting the each of the planetary gears on the planetary carrier;
wherein the ring gear is coupled to the fan shaft and the sun gear is coupled to the compressor shaft, while the planetary carrier is held at a housing side in a fixed manner,
a flexible connection device connecting the ring gear to the fan shaft, the flexible connection device permitting movement in a radial direction and in an axial direction between the ring gear and the fan shaft.

2. The aircraft engine according to claim 1, wherein the flexible connection device comprises an area having a cross-section that is U-shaped.

3. The aircraft engine according to claim 1, wherein the flexible connection device comprises an area having a cross-section that is L-shaped.

4. The aircraft engine according to claim 1, wherein the bearing device comprises a spherical bearing unit for compensating tilting movements between the planetary carrier and the each of the plurality of planetary gears and a further bearing unit for rotational decoupling between the planetary carrier and the each of the plurality of planetary gears.

5. The aircraft engine according to claim 4, and further comprising an inner bearing element arranged radially inside the each of the plurality of planetary gears, and wherein the spherical bearing unit couples the planetary carrier in an operative connection with the inner bearing element.

6. The aircraft engine according to claim 5, wherein the inner bearing element is rotatably connected to the each of the plurality of planetary gears via the further bearing unit that is arranged respectively between the each of the plurality of planetary gears and the inner bearing element.

7. The aircraft engine according to claim 5, wherein the planetary carrier includes a plurality of finger portions for respectively connecting to each of the spherical bearing units.

8. The aircraft engine according to claim 7, and further comprising a bolt fastener connecting one of the plurality of finger portions to the inner bearing element, with the bolt fastener arranged to extend in the radial direction.

9. The aircraft engine according to claim 8, wherein the spherical bearing includes a coupling element that is arranged in the area of the each of the plurality of finger portions, the coupling element including at least a partially spherical area, and wherein the bolt fastener is connected to the coupling element as well as to the inner bearing element to be approximately aligned with a middle of the each of the plurality of planetary gears.

10. The aircraft engine according to claim 8, wherein the bolt fastener is fixated in the radial direction in an area of the inner bearing element.

11. The aircraft engine according to claim 7, wherein one of the plurality of finger portions is coupled in a fixed manner the inner bearing element.

12. The aircraft engine according to claim 7, wherein the planetary carrier is connected to the housing via the flexible connection device radially inside the plurality of finger portions.

13. The aircraft engine according to claim 7, wherein the planetary carrier is attached to the housing radially outwardly of the plurality of finger portions.

14. The aircraft engine according to claim 4, wherein the further bearing unit is at least one chosen from a rolling bearing and a slide bearing.

15. The aircraft engine according to claim 1, wherein the ring gear and the sun hear each include a helically-toothed tooth area and each of the plurality of planetary gears includes two helically-toothed tooth areas which are separated from each other and are arranged at a distance from each other in the axial direction, and which respectively mesh with the helically-toothed tooth areas of the ring gear and the sun gear, wherein a helix angle of the helically-toothed tooth areas of the each of the plurality of planetary gears, the ring gear and the sun gear are embodied in a mirror-inverted manner for minimizing axial toothing forces.

16. The aircraft engine according to claim 1, wherein the planetary carrier include conduits for guiding fluid.

17. The aircraft engine according to claim 1, and further comprising a further flexible connection device connecting the planetary carrier to the housing, the further flexible connection device permitting movement in the radial direction and in the axial direction between the planetary carrier and the housing.

18. An aircraft engine, comprising:
a housing,
a compressor including a compressor shaft,
a fan shaft,
a fan driven by the compressor via the fan shaft,
an epicyclic gear connecting the compressor to the fan shaft in an area of the compressor shaft, the epicyclic gear including a ring gear, a sun gear, a planetary carrier, and a plurality of planetary gears, and for each of the plurality of planetary gears, a bearing device rotatably mounting the each of the planetary gears on the planetary carrier;
wherein the ring gear is coupled to the fan shaft and the sun gear is coupled to the compressor shaft, while the planetary carrier is held at a housing side in a fixed manner,
a flexible connection device connecting at least one chosen from the ring gear and the fan shaft, and the planetary carrier and the housing, the flexible connection device permitting movement in a radial direction and in an axial direction between the at least one chosen from the ring gear and the fan shaft, and the planetary carrier and the housing;
wherein the bearing device comprises a spherical bearing unit for compensating tilting movements between the planetary carrier and the each of the plurality of planetary gears and a further bearing unit for rotational decoupling between the planetary carrier and the each of the plurality of planetary gears.

19. The aircraft engine according to claim 18, and further comprising an inner bearing element arranged radially inside the each of the plurality of planetary gears, and wherein the spherical bearing unit couples the planetary carrier in an operative connection with the inner bearing element;

wherein the inner bearing element is rotatably connected to the each of the plurality of planetary gears via the further bearing unit that is arranged respectively between the each of the plurality of planetary gears and the inner bearing element.

* * * * *